E. RUBES.
FLEXIBLE METALLIC TUBING.
APPLICATION FILED JUNE 8, 1908.
916,890.  Patented Mar. 30, 1909.
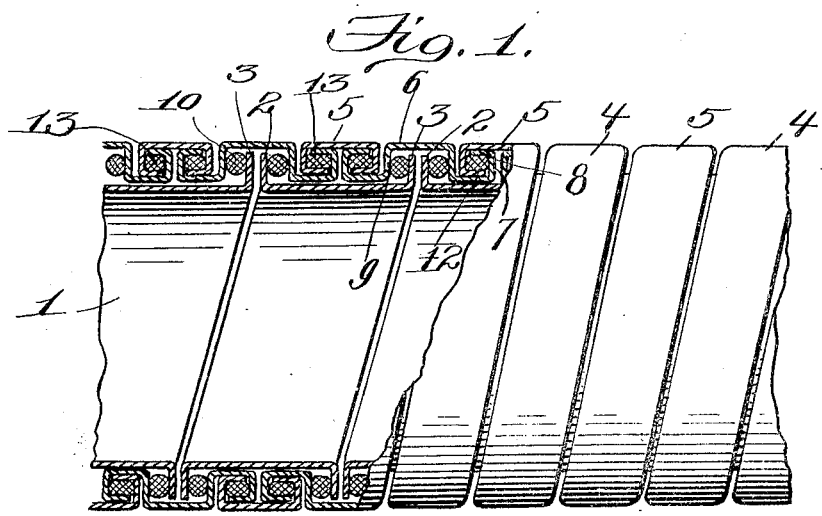
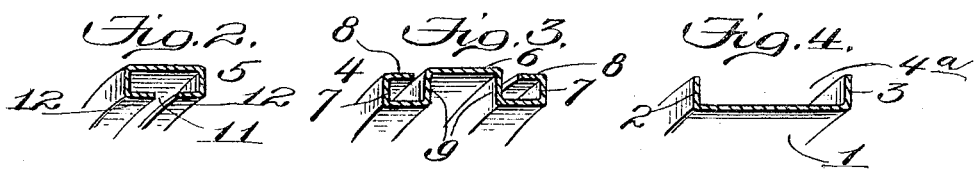
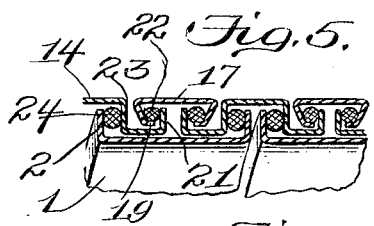
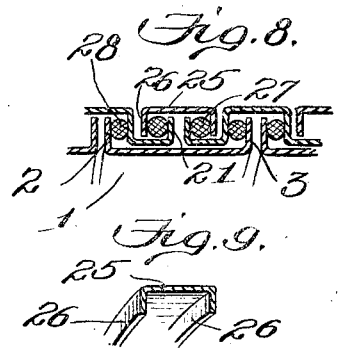
Witnesses:
Inventor
Ernest Rubes
By James L. Norris
Atty

UNITED STATES PATENT OFFICE.

ERNEST RUBES, OF BROOKLYN, NEW YORK.

FLEXIBLE METALLIC TUBING.

No. 916,890.  Specification of Letters Patent.  Patented March 30, 1909.

Application filed June 8, 1908. Serial No. 437,369.

*To all whom it may concern:*

Be it known that I, ERNEST RUBES, a citizen of the United States, residing at Brooklyn, in the county of Kings and State of New York, have invented new and useful Improvements in Flexible Metallic Tubing, of which the following is a specification.

This invention relates to metallic flexible tubing for general use, but particularly adapted as a conveying means for high steam pressure and compressed air.

The primary object of the invention is to provide a readily flexing metallic tube or hose having a special arrangement of components joined in such manner as to prevent leakage at any point and characterized by a superiority of structure, strength and durability as compared to similar devices previously produced.

The invention consists in the construction and arrangement of parts hereinafter specified.

In the drawing: Figure 1 is an elevation of a portion of a tube or hose partially broken away and embodying the features of the invention. Figs. 2, 3 and 4 are detail views of portions of the essential components of the tube or hose as shown by Fig. 1. Fig. 5 is a detail view in longitudinal section of a portion of the tube or hose showing a slight modification. Figs. 6 and 7 are detail views of two of the components of the tube or hose as shown by Fig. 5. Fig. 8 is a detail view in longitudinal section of a portion of the tube or hose showing a further modification. Fig. 9 is a detail view of one of the components of the tube or hose shown by Fig. 8.

Similar characters of reference are employed to indicate corresponding parts in the several views.

The numeral 1 designates a tubular core, inner support or lining, consisting of a metallic ribbon or strip which is spirally wound and formed with outwardly extending edge flanges 2 and 3 providing a channel 4ª. This core, support or lining by reason of its channeled formation serves as a receptive means for the remaining components of the tube or hose and is common to all of the forms shown by the drawing. This core, inner support or lining has the contiguous flanges 2 and 3 spaced sufficiently to insure flexibility, and though the said core is formed from a strip or ribbon of metal having considerable width, its jointure and coöperation with the remaining components is such as not to set up resistance to the desirable flexing of the tube or hose as a whole, and owing to the width of the several coils a more effective, non-leaking joint may be produced between the said core, inner support or lining and the outer components of the tube or hose. From a standpoint of economy and expedition in the structure and formation of the tube or hose, the rather wide dimension of the coils of the core, inner support or lining 1 is very effective, as the said core, support or lining may be more rapidly shaped on a suitable mandrel and the foundation structure of the tube or hose more quickly produced than if a narrower strip was used. The remaining components of the tube or hose consist of an outer coupling member 4 and a locking member 5. The coupling member 4 also consists of a ribbon or strip of metal having considerable width bent to form a central housing or flat arch 6 and box flange 7 at opposite sides, the said box flanges having their horizontal extremities 8 spaced from the adjacent vertical walls 9 of the housing or flat arch 6, as clearly shown by Fig. 3. The coupling member 4 is spirally wound on and over the core, inner support or lining 1, the housing or flat arch 6 of each coil of the coupling member covering the flanges 2 and 3, the latter being centrally disposed with relation to the housing or flat arch 6, as shown by Fig. 1, and between the said flanges 2 and 3 and the vertical walls 9 of the housing an asbestos packing cord or strip 10 circular in cross-section is interposed and spirally wound with the said coupling member at the time the latter is applied.

The locking member 5 is in the form of a tube rectangular in cross-section, as shown by Figs. 1 and 2, and having an inner centrally disposed throat 11 extending fully throughout the length thereof, and provided with inner horizontal flanges 12 defining said throat or forming the walls for the latter. This locking member 5 is spirally wound over and connected with contiguous box flanges 7 of the coupling member 4, the flanges 12 of the locking member and the terminals or outer horizontal flanges 8 of the coupling member interfitting so that the said terminals or outer flanges 8 of the coupling member will lie within and against the outer portion of the locking member, but inclosed within the latter, as shown by Fig. 1. In applying the locking member 5 over and spirally winding the same on the coupling member the flanges 12 of the said locking member are formed or upset inwardly, and a space is produced between the said flanges 12 of the locking member and the outer terminals or flanges 8 of the coupling member which is filled with an asbestos packing 13 which is compressed between the flanges 12 and the terminals or flanges 8 forming a part of the box flanges 7. The outer surfaces of the coupling member 4 and locking member 5 are flush and sufficient space is left between the flanges 9 of the said coupling member and the adjacent portions of the locking member to permit free movement of the said members in flexing or bending the tube or hose. It will be observed that the channel 4ª of the core, inner support or lining 1 serves as a receptive means for a greater portion of each coil of the coupling member and embodying the box flanges and about one-half of the housing, and, further, that the locking member 5 is disposed in central relation with respect to the said channel 4ª, and this disposition of the several components, together with the introduction of the packings 12 and 13 is effective in producing a tight flexible jointure of the said components and the formation of a tube or hose which will be practically serviceable as a conveying means for steam under high pressure and compressed air without the least liability of leakage.

As hereinbefore indicated, the core, inner support or lining 1 is the same in the structures shown by Figs. 5 and 8, and in Fig. 5 the coupling member 14 is slightly varied, as clearly illustrated by Fig. 7, and the variation consists in dispensing with the box flanges 7 hereinbefore described and replacing the latter by right-angular flanges 15 fully open at their outer portions, as at 16. The locking members 17 in this instance are also of tubular form, but are distinguished from the locking members shown by Figs. 1 and 2 by having the sides inwardly bent at an acute angle as at 18 and terminating in short horizontal flanges 19. Between the inner terminals of the flanges 19 a throat 20 is formed, into which project the terminal straight flanges 21 of the coupling member 14 and which project outwardly, as shown by Fig. 5, and between the flanges 21, 18 and 19 asbestos packing strips 22 are introduced. Between the flanges 2 of the core or inner support 1 and the flanges 23 inwardly projecting to form a part of the outwardly opening flanges 15 at opposite sides of the coupling member 14, an asbestos packing strip 24 is introduced.

It will be understood that the components of the tube or casing as shown by Fig. 5 are spirally wound in a manner similar to the components illustrated by Fig. 1, and it will be observed that the core, inner support or lining 1 in the modified construction shown by Fig. 5 serves both as an interlocking and receptive means for the remaining components in a manner similar to the construction disclosed by Fig. 1.

In Fig. 8 the core, inner support or lining 1 is the same as in the preceding figures and the coupling member 14 is precisely the same in its construction as that illustrated by Fig. 5, and like reference characters are applied thereto. In the modification shown by Fig. 8 the essential difference consists in the locking member 25 which, in this instance, consists of a channeled strip having side flanges 26 at right angles to the main body of the member and without inwardly projecting flanges at the terminals of the side flanges. Between the flanges 21 of the coupling member and the flanges 26 of the locking member an asbestos packing cord or strip 27 is interposed, and between the flanges 2 of the core, inner support or lining 1 and the flanges 23 of the coupling member a second packing strip or cord 28 is inserted as in the previously described structures.

It will be understood that the packing strips in all the forms of the device shown serve not only as means to form tight joints between the connected components, but also act as means for assisting in maintaining the assembled components in operative flexing relation without liability of separation or disjointure.

The locking member or component in its different forms is a combining or joining means for the remaining components and is effective in producing a much stronger fastening with less trouble in assemblage than has been possible heretofore in tube or pipe constructions of this class. There are essentially three thicknesses of metal superposed and fastened and forming a smooth and even surface both outside and inside of the tube. A flexible tube of this type and particular construction will withstand considerable outside and inside strain or pressure and the parts will not become detached or dissociated.

Having thus described the invention, what is claimed as new, is:

1. A flexible tubing of the class specified composed of a channeled lining spirally wound, a coupling member fitted in portions of the lining and covering the side flanges thereof, a locking member having inwardly projecting flanges coöperating with and joining the extremities of the coupling member, and packing strips introduced between parts of the lining, coupling and locking members.

2. A flexible metallic tubing of the class specified composed of a lining and having an outer channel, a coupling member applied over and embracing contiguous portions of the lining and having flanged side portions, a locking member engaging and covering the flanged side portions of the coupling member, and packing strips introduced between portions of the lining, coupling and locking members, the lining, coupling and locking members being spirally wound.

3. A flexible metallic tube of the class specified composed of an inner lining having an outer channel formed by side edge flanges, an outer coupling member spirally wound over the lining and having portions embracing adjacent flanges of the latter and of itself provided with receptive means at opposite sides, and a locking member spirally wound over the coupling member and engaging the receptive means and securing the contiguous edge portions of the said coupling member, packing strips being interposed between portions of the lining, coupling and locking members.

4. A flexible metallic tubing of the class specified composed of an inner lining having an outer channel extending fully thereover, an outer coupling member covering and securing contiguous edges of the lining and fitting in the channel of the latter, and a locking member partially fitting in the side portions of the coupling member and securing and covering contiguous edges of the said coupling member, packing strips being interposed between portions of the lining and the two members.

5. A flexible metallic tube of the class specified composed of an inner spirally wound channeled lining, an outer coupling member spirally wound around and securing edge portions of the lining, a locking member spirally wound over and securing contiguous edge portions of the coupling member, and packing strips introduced between portions of the lining, coupling and locking members, the locking member being flush with the coupling member.

6. A flexible metallic tube of the class specified composed of an inner spirally wound channeled lining, provided with edge flanges, an outer coupling member spirally wound on the lining and having a housing to receive the edge flanges of the latter and provided with opposite side edge portions projecting into the channel of the lining, a locking member spirally wound on the coupling member and embracing the side edge portions of the said coupling member, and packing strips introduced between portions of the lining, coupling and locking members.

7. A flexible metallic tube of the class specified consisting of a spirally wound lining having an outer channel formed by side flanges, a coupling member for the lining fitted over the side flanges and having its side portions projected into the channel, and a locking member embracing and covering the side portions of the coupling member, the two members being spirally wound.

8. A flexible tube of the class specified composed of an inner spirally wound lining having an outer channel formed by outwardly projecting side flanges, a coupling member spirally wound on and embracing contiguous side flanges of the lining and also having its side portions projected into the channel and formed with flanged seat means, a locking member having side portions let into and coöperating with the seat means at opposite sides of the coupling member to form a flush outer surface with the latter, and packing strips introduced between portions of the lining and members.

9. A flexible metallic tube of the class specified composed of an inner spirally wound wide strip of metal having an outer channel formed by side flanges, an outer coupling member extending over and embracing contiguous side flanges of the lining and projecting into portions of the channel and spirally wound on the said lining, a spirally wound locking member extending over and covering and also projecting into portions of the coupling member, and packing strips introduced between portions of the lining and members.

10. A flexible metallic tube of the class specified composed of an inner spirally wound channeled lining, an outer coupling member spirally wound on and having a housing to receive portions of the lining and provided with box flanges at opposite sides, a spirally wound locking member of tubular form fitted into and embracing portions of the box flanges, the said box flanges and locking member having horizontal flanges in contiguous relation, packing strips introduced between the said horizontal flanges, and other packing strips inserted between portions of the lining and the box flanges of the coupling member.

In testimony whereof I have hereunto set my hand in presence of two subscribing witnesses.

ERNEST RUBES.

Witnesses:
C. A. ROWE,
CHAS. S. HYER.